United States Patent [19]

Barrett et al.

[11] 4,008,961
[45] Feb. 22, 1977

[54] MONOCHROMATIC DETECTION OF PLURAL ROTATIONAL RAMAN SPECTRA GENERATED BY MULTIPLE FREQUENCY EXCITATION

[75] Inventors: Joseph J. Barrett, Morris Plains; Ernest D. Buff, Bernardsville, both of N.J.

[73] Assignee: Allied Chemical Corporation, Morris Township, N.J.

[22] Filed: Apr. 21, 1975

[21] Appl. No.: 570,107

[52] U.S. Cl. .............................................. 356/75
[51] Int. Cl.² ...................................... G01J 3/44
[58] Field of Search ............... 356/75, 103, 106 S

[56] References Cited
UNITED STATES PATENTS

| | | | |
|---|---|---|---|
| 3,723,007 | 3/1973 | Leonard | 356/75 |
| 3,768,908 | 10/1973 | Zaromb | 356/75 |
| 3,853,404 | 12/1974 | Barrett | 356/75 |

Primary Examiner—John K. Corbin
Assistant Examiner—F. L. Evans
Attorney, Agent, or Firm—Ernest D. Buff

[57] ABSTRACT

A method and apparatus for spectroscopic gas analysis are provided. Plural beams of monochromatic radiation are directed through gaseous material. A tuning mechanism adjusts the frequency difference between the radiation beams to equal substantially an odd integral submultiple of the frequency difference between adjacent spectral components of the periodic spectrum for a preselected constituent of the gaseous material. Radiation scattered by the gaseous material is received by a filtering mechanism adapted to transmit selectively a detectable signal composed of a single superimposed spectral component of the spectrum. The signal is received by a detecting means which indicates the intensity thereof.

22 Claims, 4 Drawing Figures

MONOCHROMATIC DETECTION OF PLURAL ROTATIONAL RAMAN SPECTRA GENERATED BY MULTIPLE FREQUENCY EXCITATION

BACKGROUND OF THE INVENTION

This invention relates to a field of spectroscopy, and more particularly to apparatus and method for detecting and quantitatively measuring gaseous constituents through simultaneous transmission of their periodic spectra.

DESCRIPTION OF THE PRIOR ART

In the apparatus used for spectroscopic gas analysis, light produced by scattering in gas is collected and transmitted to an interferometer scanned to selectively transmit simultaneously the rotational Raman spectra of a preselected constituent of the gas. The output of the interferometer is converted to a detectable signal and displayed.

One of the major problems with such apparatus is the difficulty of analyzing minute quantities of gaseous constituents. The output of the interferometer represents a relatively low intensity signal that is frequently altered or obscured by spectral interference between rotational Raman spectra of the gas being analyzed and spectra of coexistent gases. The problem is particularly troublesome when the gas being analyzed is located at a point distant from the apparatus. To alleviate such problems it has been necessary to provide the apparatus with highly sensitive forms and combinations of detectors, filters, control systems and the like, which are relatively expensive.

SUMMARY OF THE INVENTION

The present invention provides an economical, highly sensitive apparatus for spectroscopic gas analysis. Such apparatus has radiation source means for generating a plurality of spatially superimposed beams of monochromatic radiation. The radiation source means has associated therewith a tuning means for adjusting the frequency difference between radiation beams of adjacent frequency to equal substantially an odd integral submultiple of the frequency difference between adjacent spectral components of the periodic spectrum for a preselected constituent of gaseous material. A projecting means is provided for directing the radiation beams through gaseous material to provide scattered radiation. The scattered radiation produced by each of the beams has a separate set of spectral components periodic in frequency and the spectral components for the preselected constituent are superimposed to form, within the spectrum produced by combined scattering of the radiation beams, the periodic spectrum for the preselected constituent. A filtering means adapted to receive the scattered radiation selectively transmits a detectable signal composed of a single superimposed spectral component of the spectrum, whereby the detectable signal is derived from a plurality of spectral lines and has an intensity substantially equal to their sum.

Further, the invention provides a method for spectroscopically analyzing gas comprising the steps of generating a plurality of spatially superimposed beams of monochromatic radiation; adjusting the frequency difference between radiation beams of adjacent frequency to equal substantially an odd integral submultiple of the frequency difference between adjacent spectral components of the periodic spectrum for a preselected constituent of gaseous material; directing said radiation beams through said gaseous material to produce scattered radiation, the scattered radiation produced by each of said radiation beams having spectral components periodic in frequency and the spectral components for said preselected constituent being superimposed to form within the spectrum produced by combined scattering by said radiation beams, the periodic spectrum for said preselected constituent; filtering the scattered radiation to selectively transmit a detectable signal composed of a single superimposed spectral component of the spectrum.

The radiation source preferably has associated therewith a multiple frequency beam generating means such as a Fabry-Perot interferometer (FPI) having a mirror separation adjusted to transmit any given pair of the plurality of radiation beams at a frequency differential correlated with the frequency difference between adjacent spectral components of the periodic spectrum for a preselected molecular species of the gaseous material. This condition obtains when $$d = n/8\mu B$$

where $d$ is the mirror separation of the FPI, $n$ is an odd integer, $\mu$ is the index of refraction of the medium between the mirrors and B is the molecular rotational constant of the species. For a given molecular species and a given exciting frequency, the rotational spectra exist at a unique set of frequencies. Each of these spectra can be shifted in frequency to produce a plurality of spectral components of the same periodicity as that of such spectra. Shifting the frequency of a plurality of such spectra by a differential substantially equal to the frequency spacing therebetween produces a spectrum in which only the spectra of the preselected species are superimposed. Identification of the species having a particular set of rotational spectra is made positively when superimposed spectra are detected for components corresponding to several rotational spectra of the species. Advantageously, the intensity of the detectable signal is not affected by molecular species other than the species appointed for detection. Moreover, the detected signal has an intensity substantially equal to the sum of a plurality of rotational spectral lines. Spectral interference is minimized, the sensitivity of the apparatus is increased and highly sensitive forms and combinations of detectors, filters and control systems are unnecessary. Accordingly, the method and apparatus of this invention permits gaseous constituents to be detected and measured with high accuracy and at less expense than systems wherein scattering of the gaseous material is effected by a single beam of monochromatic radiation.

BRIEF DESCRIPTION OF THE DRAWINGS

The invention will be more fully understood and further advantages will become apparent when reference is made to the following detailed description of the preferred embodiments of the invention and the accompanying drawings in which.

DESCRIPTION OF THE PREFERRED EMBODIMENTS

Radiation carrying rotational spectra is found in each of the visible, infrared and ultraviolet frequency regions. As a consequence, the invention will function with radiation having a relatively wide range of frequencies. For illustrative purposes, the invention is described in connection with apparatus and method for measuring rotational Raman spectra of gaseous material scattered by radiation from the visible frequency region. When applied in this manner, the invention is particularly suited to detect and to measure quantitatively minor constituents of a gaseous material such as air. It will be readily appreciated that the invention can be practiced using radiation from any of the foregoing frequency regions, and that it can be employed for similar and yet diversified uses, such as the analysis of vibration-rotation spectra, the determination of molecular gas constants and the like.

Figure 1:
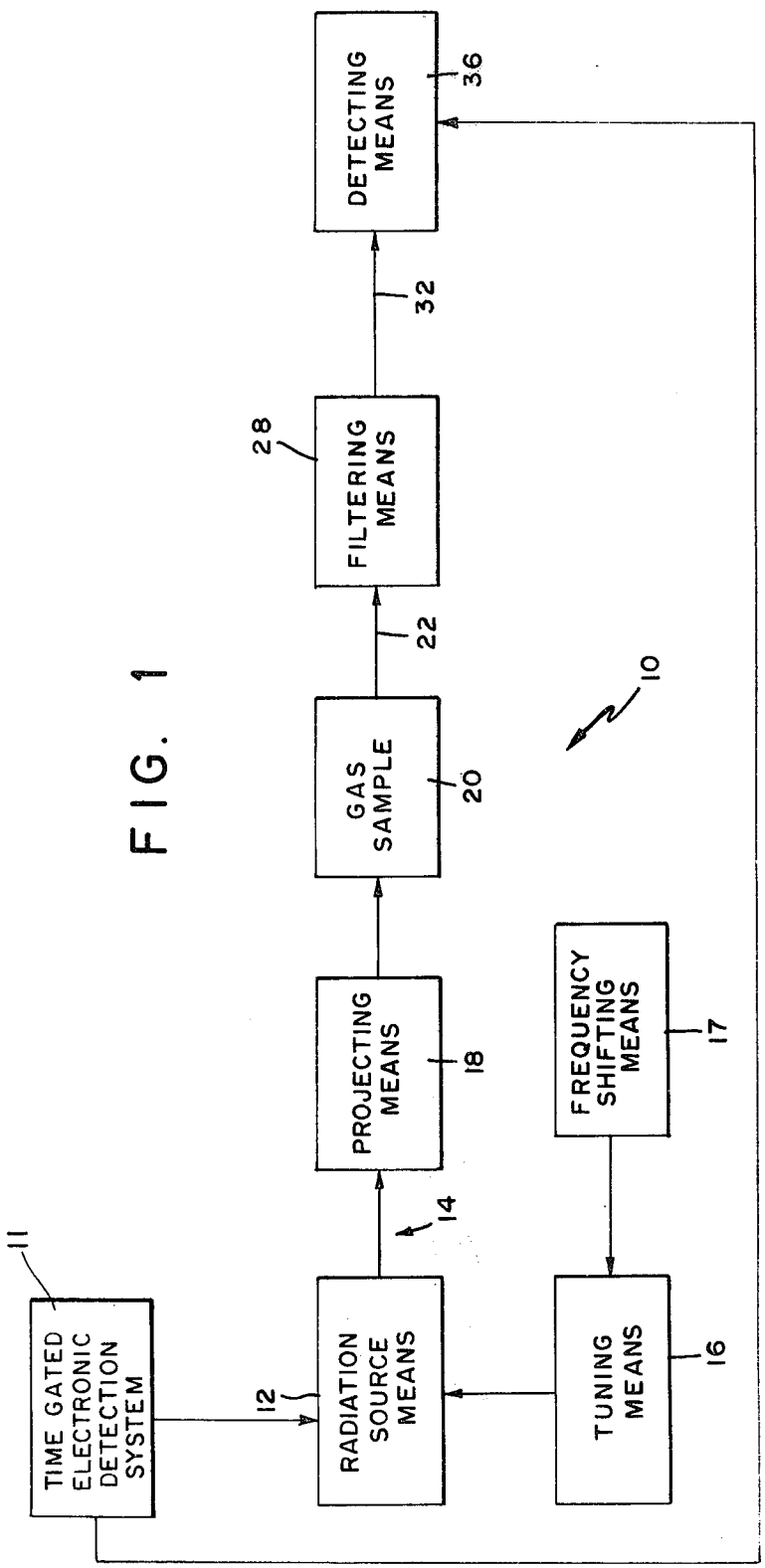
FIG. 1 is a block diagram showing apparatus for spectroscopic gas analysis.
Figure 3:
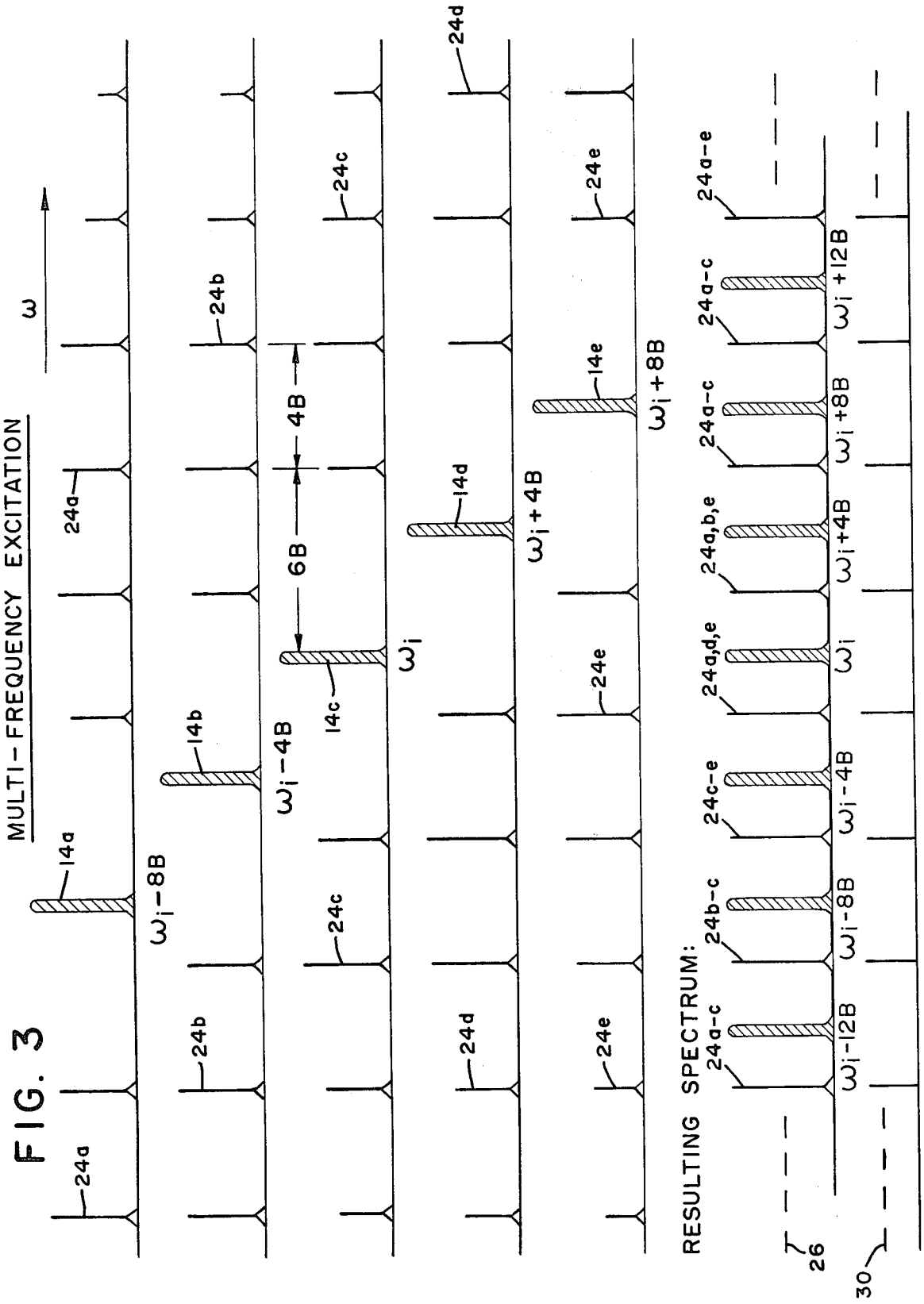
FIG. 3 is a schematic representation of spectra contained in scattered radiation produced by a plurality of radiation beams of the apparatus of FIG. 1.

Referring to FIG. 1 of the drawings, there is shown preferred apparatus for spectroscopic gas analysis. The apparatus, shown generally at 10, has radiation source means 12 for generating a plurality of spatially superimposed beams, shown generally at 14, of monochromatic radiation. The radiation source means 12 has associated therewith a tuning means 16 for adjusting the frequency difference between radiation beams of adjacent frequency to equal substantially an odd integral submultiple of the frequency difference between adjacent spectral components of the periodic spectrum for a preselected constituent of gaseous material. A projecting means 18 is provided for directing the beams of radiation 14 through gaseous material in compartment 20 to produce scattered radiation 22. The scattered radiation 22 produced by each of the beams 14, shown in FIG. 3 as $14_{a-e}$, respectively, has a separate set of spectral components $24_{a-e}$ periodic in frequency. Spectral components $24_{a-e}$ for the preselected constituent are superimposed to form, within the spectrum 26 produced by combined scattering of the radiation beams 14, the periodic spectrum 30 for the preselected constituent. A filtering means 28 is adapted to receive the scattered radiation 22. The filtering means 28 selectively separates a single superimposed spectral component of the spectrum from the remaining components thereof and transmits the separated component, in the form of a detectable signal 32, to a detecting means 36 which indicates the intensity of the signal 32.

Figure 2:
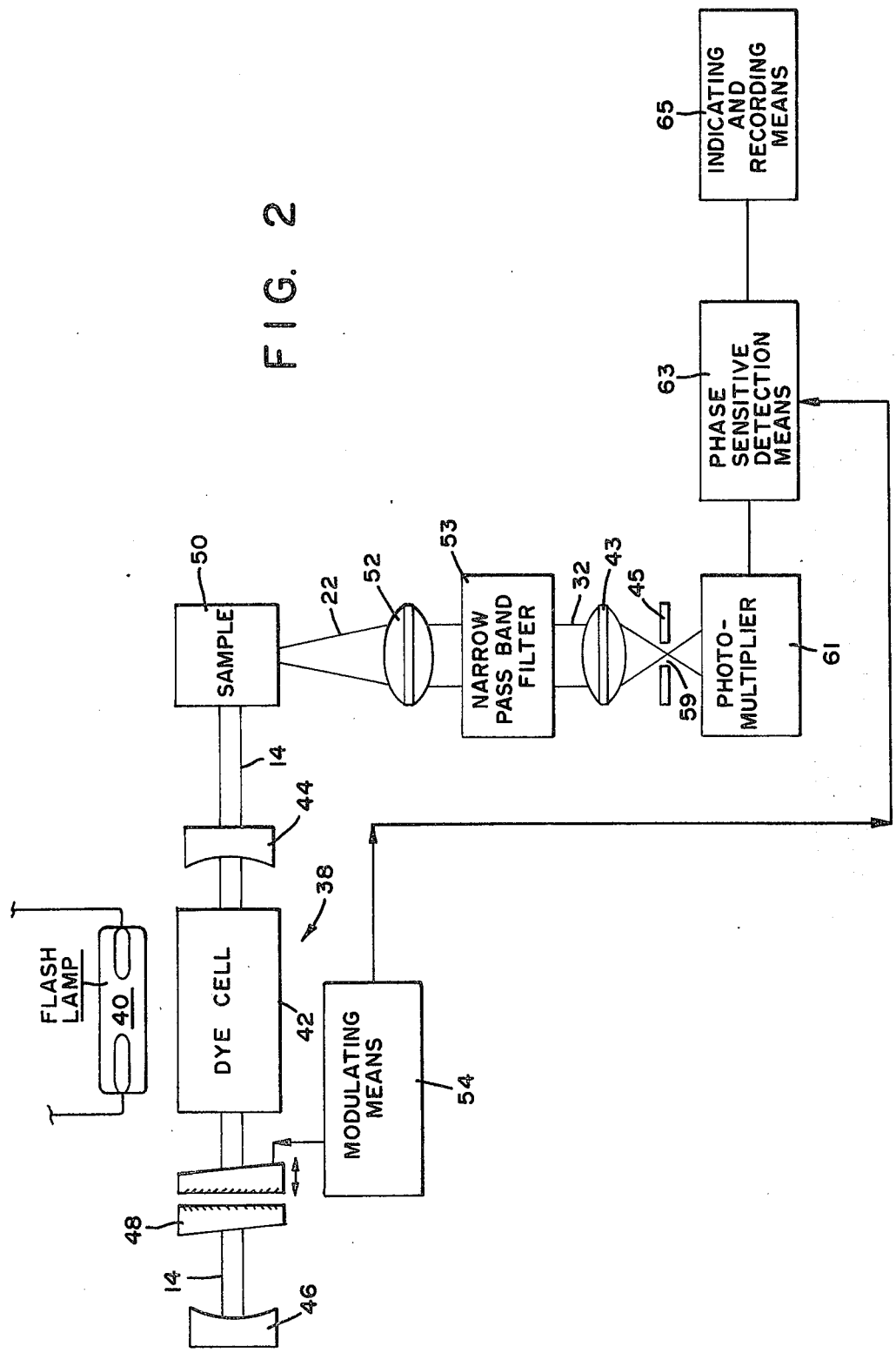
FIG. 2 is a schematic diagram of the apparatus of FIG. 1.

More specifically, as shown in FIG. 2, the radiation source means 12 can comprise a dye laser, shown generally at 38, adapted to be excited by energy from flash lamp 40 or from a pulsed nitrogen laser, a frequency doubled, pulsed ruby laser or the like, and a beam generating means 48. Dye laser 38 includes (1) a cell 42 containing dye material and (2) a laser cavity comprised of a partially transmitting output mirror 44 and an optical element 46 for generating laser radiation. The dye materials which are suitable for use in the dye laser 38 are any of those conventionally employed which, when excited, emit light having frequencies in the transparency range of the gaseous material being analyzed. Typical dye materials include Rhodamine 6G, Kiton Red, Cresyl Violet, Nile Blue and the like.

Radiation emitted from the dye material in dye cell 42 is continuously tunable over a wide frequency range. The beam generating means 48 separates the radiation into a plurality of spatially superimposed beams 14 of monochromatic radiation, which are transmitted from radiation source means 12 via output mirror 44. Generation of the detectable signal 32 is most efficient when the radiation emitted from the dye laser 38 has a line width and frequency stability about equal to or less than the line width of the rotational spectra of the gas appointed for detection.

The use of a pulsed dye laser as the radiation source means 12 together with a time gated electronic detection system 11 permits determination of pollutant concentration and location of a sample of gaseous material remote from the apparatus 10. For example, by providing the apparatus 10 with (1) means for measuring the time interval required to send a laser pulse into the sample and receive a return signal caused by light scattered therein and (2) means for measuring the amplitude of the return signal, the distance of the sample from the apparatus 10 as well as the pollutant concentration thereof is readily obtained. A pulsed laser adapted to determine pollutant concentration and location in the above manner preferably has means for generating radiation having a line width and frequency stability about equal to or less than the line width of the rotational spectra of the gas appointed for detection.

The beam generating means 48 can have a variety of forms. In one embodiment of the apparatus 10, the beam generating means 48 comprises interference-producing means for providing a plurality of transmission windows regularly spaced in frequency. Beam generating means 48 is disposed within the cavity of dye laser 38 in the path of radiation from the dye material.

The tuning means 16 is connected to the beam generating means and includes means for variably controlling the frequency of each order. The tuning means is adjusted so that the frequency difference between radiation beams of adjacent frequency equals substantially an odd integral submultiple of the frequency difference between adjacent spectral components of the periodic spectrum for a preselected constituent of gaseous material. Generally such periodic spectrum is that produced by scattering of a minor constituent of the gaseous material as, for example, the rotational Raman periodic spectrum of sulfur dioxide or carbon monoxide in a sample of air.

A projecting means, associated with the dye laser 38, introduces the plurality of spacially superimposed radiation beams 14 into gaseous material in sample compartment 50 in one direction, which will be considered to be substantially horizontal for convenience in referencing directions, but may, of course, be in any direction desired. Raman scattered radiation from the gaseous material in sample compartment 50 is collected, collimated and transmitted to the primary interferometric means 28 by a radiation conditioning means 52, which may be a lens, or other suitable optical system. As long as the gaseous material contains molecules which are of the linear or symmetric top variety, the scattered radiation from compartment 50 will exhibit spectral components periodic in frequency.

The filtering means 28 can comprise a narrow pass band interference filter 53 disposed in series with dye laser 38 in the path of the scattered radiation 22 from sample compartment 50 and radiation conditioning means 52. In addition, the filtering means 28 can include a lens 43 and a pinhole stop 45 which cooperate to effect separation of the detectable signal 32 from the scattered radiation 22. The latter includes radiation beams 14 together with a plurality of superimposed spectra forming the periodic spectra of the preselected constituent. Interference filter 53 is constructed to transmit radiation within a narrow frequency range centered on the frequency of one of the superimposed spectral components of the periodic spectrum for the preselected constituent. Thus, interference filter 53 is provided with interference-producing means for providing a single transmission window having its frequency centered on that of one of such superimposed spectral components.

Centering of the transmission window is accomplished by providing tuning means 16 with a frequency shifting means 17, shown in FIG. 1. The frequency shifting means 17 displaces the frequencies of radiation beams 14 relative to the frequency of the transmission window so that the frequency of the transmission window is located half-way between adjacent radiation beams. Frequency shifting means 17 can, alternatively, be associated with interference filter 53 of filtering means 28, although such embodiment of the apparatus 10 is more expensive to construct and is therefore less preferred than that wherein the frequency shifting means 17 is associated with the tuning means 16.

Before describing how the apparatus of FIG. 2 can be used to determine the intensity of signal 32, it would be helpful to explain the principles underlying monochromatic detection of plural rotational spectra generated by multifrequency excitation.

Illustrative of the manner in which multiple frequency excitation can be used to produce the periodic spectrum 26 is the case of rotational Raman scattering by linear molecules excited with a single optical frequency $\omega_0$. For the Stokes branch lines, the Raman frequency of the rotational line with quantum number J is $$\omega_S = \omega_0 - (4B - 6D)(J + 3/2) + 8D(J + 3/2)^3 \qquad (1)$$

where D is the centrifugal distortion constant which accounts for the slight departure of the rotational spectrum from exact 4B periodicity. The peak intensity of the J-th Stokes line is $$H_S(J) = K(B/T)\left[\frac{3(J+1)(J+2)}{2(2J+3)}\right]\left(\frac{\omega_S}{\omega_0}\right)^4 \exp[-BJ(J+1)hc/kT] \qquad (2)$$

where K is a proportionality constant, T is the absolute temperature and $h$, $c$, and $k$ are Planck's constant, the speed of light and Boltzmann's constant, respectively. For the anti-Stokes branch, the corresponding Raman frequency and peak intensity are given by $$\omega_A = \omega_0 + (4B - 6D)(J + 3/2) - 8D(J + 3/2)^3 \qquad (3)$$

and $$H_A(J) = K(B/T)\left[\frac{3(J+1)(J+2)}{2(2J+3)}\right]\left(\frac{\omega_A}{\omega_0}\right)^4 \exp[-B(J+2)(J+3)hc/kT] \qquad (4)$$

The most intense rotational line occurs for the rotational quantum number $J_m$ given by the equation $$J_m = [kt/(2Bhc)]^{1/2} - 1/2 \qquad (5)$$

where $J_m$ is rounded off to the nearest integer value.

For the beam generating means, one may use a Fabry-Perot interferometer. The Fabry-Perot interferometer consists of two flat mirrored plates which are aligned parallel to each other. Interference fringes are produced by multiple reflections of light between the mirrored surfaces. If $I_i$ is the intensity of the incident light, then the intensity of the light ($I_t$) which is transmitted by the Fabry-Perot interferometer is given by the Airy function.

$$I_t = I_i \cdot [T^2/(1-R)^2 \cdot (1 + F \sin^2 \phi/2)^{-1}] \qquad (6)$$

where $T + R + A = 1$ and $\phi$ is the phase difference between interfering rays and is equal to $$\phi = 4\pi\mu\omega d \qquad (7)$$

for incident rays normal to the interferometer mirrors. The transmittance, reflectance and absorptance of the Fabry-Perot mirrors are represented by the symbols T, T and A, respectively. The symbol $\mu$ denotes the refractive index of the medium between the Fabry-Perot mirrors and d is the mirror separation. The wavenumber $\omega$ (in units of $cm^{-1}$) is equal to the reciprocal of the wavelength of the incident light. Transmission maxima of $I_t$ occur for $\sin \phi/2$ equal to zero. Hence $$\phi = 2\pi m \qquad (8)$$

where $m = 0, 1, 2, \ldots$ and denotes the order of interference. For a fixed value of the mirror separation $d$, the maximum values of the transmitted light intensity occur for the frequency interval $\Delta\omega$ of the incident light equal to $$\Delta\omega = (2\mu d)^{-1} \qquad (9)$$

where $\Delta\omega$ is known as the free spectral range of the interferometer. Therefore, the Fabry-Perot interferometer behaves like a comb filter with transmission windows which are regularly spaced in frequency by an amount equal to $\Delta\omega$.

If a Fabry-Perot interferometer is used as the beam generating means 48 (shown in FIG. 2) the output of the dye laser will consist of a spatial superposition of light beams regularly spaced in frequency, the frequency separation between adjacent light beams being equal to the free spectral range $\Delta\omega$ of the secondary interferometric means 48. If the free spectral range $\Delta\omega$ $\Delta\omega$ of the secondary interferometric means is chosen to be equal to $4B/n_2$ where B is the rotational constant of the gas appointed for analysis and $n_2$ is an odd integer, then the output beams of the dye laser will have a frequency distribution given by $$\omega = \omega_0 + l(4B/N_2) \tag{10}$$

where $\omega_0$ is a frequency in the center of the dye laser gain region and l takes on the integral values ..., $-2$, $-1$, 0, 1, 2, ... . The dye laser gain region is the frequency interval over which laser oscillations can occur. The maximum value, $l_m$, of the integer l is limited by the frequency width, W, of the dye laser gain region. Hence $$W = 2l_m(4B/N_2)$$

or $$l_m = Wn_2/(8B). \tag{11}$$

Therefore, the multiple frequency excitation consists of $2l_m+1$ discrete frequencies.

In order to simplify the analysis, assume that the effects of the centrifugal distortion constant D in equations (1) and (3) can be neglected. This assumption is quite valid since, for typical molecules, the ratio D/B of rotational constants is of the order of $10^{-6}$. Then, the frequencies of the rotational Raman lines produced by the single frequency $\omega_o$ may be expressed as $$\omega_{S,A} = \omega_0 \mp 4B(J+3/2) \tag{12}$$

where the minus and plus signs refer to Stokes and anti-Stokes lines, respectively. Using multiple frequency excitation of the rotational Raman spectra, the frequencies of the individual rotational Raman lines are given by the equation $$\omega_{S,A} = \omega_0 + l(4B/n_2) \quad 4B(J + 3/2) \tag{13}$$

where the integer value of l varies from $-l_m$ to $l_m$ and the rotational quantum number J takes on integer values from zero to some upper limit which may be defined as that value of the rotational quantum number $J_M$ for which the magnitudes of the Stokes and anti-Stokes intensities [equations (2) and (4)] become negligible. The analysis can be further simplified by setting $n_n$ in equation (13) equal to unity and considering, for the present, only the Stokes branch lines. Equation (13) then becomes $$\omega_S = \omega_0 + 4Bl - 4B(J+3/2)$$

or $$\omega_S = \omega_0 - 6B + 4B(l - J). \tag{14}$$

For l = J, the Raman lines have the frequency ($\omega_0 - 6B$): e.g. for l = 0, the exciting frequency is $\omega_0$ and the J = O Stokes line has the frequency ($\omega_0 - 6B$); for l = 1, the exciting frequency is ($\omega_0 + 4B$) and the J = 1 Stokes line has the frequency ($\omega_0 - 6B$), and so on. Therefore, the resulting Raman signal at the frequency ($\omega_0 - 6B$) is equal to the superposition of rotational Raman lines with different J-values each of which was generated by a different exciting frequency. For l = J + 1, this process is repeated and the resulting Raman signal appears at the frequency ($\omega_0 - 10B$). In general, the total number frequencies of all the Stokes lines which are produced by the multiple frequency excitation is $$\omega_S = \omega_0 - 6B + 4B \sum_{l=-l_m}^{l_m} \sum_{J=0}^{J_M} (l - J) \tag{15}$$

and the corresponding number of anti-Stokes frequencies is $$\omega_A = \omega_0 + 6B + 4B \sum_{l=-l_m}^{l_m} \sum_{J=0}^{J_M} (l + J). \tag{16}$$

The frequencies of the Raman lines relative to $\omega_0$ in the resulting spectrum 26 are $$\omega_R = \omega_0 \pm 2B (2j + 1) \tag{17}$$

where j is an integer with values from zero to ($l_m + J_M$). For a value of $n_2$ [equation (10)] different from unity, equation (17) may be written as $$\omega_R = \omega_0 \pm (2B/n_2) (2j + 1). \tag{18}$$

For $l_m$ $J_M$, and in the frequency interval $\omega_0 \pm 2Bl_m$, the number of Stokes and anti-Stokes lines which are superimposed to form one Raman frequency in the spectrum 26 is equal to $2J_M$. The total irradiance at a single Raman frequency (corresponding to a specific j value in equation (17)) in the spectrum 26 is $$I(\omega_R) = \sum_{J=0}^{J_M} [H_S(J) \cdot I_{l'} + H_A(J) \cdot I_{l''}] \tag{19}$$

where $l' = j + J + 1$ for Stokes lines and $l'' = j - J - 1$ for anti-Stokes lines and $I_l$ is the irradiance of the l-th line of the multiple frequency excitation. The total irradiance at substantially all of the Raman frequencies in spectrum 26 is where $l' = j + J + 1$ for Stokes lines and $l'' = j - J - 1$ for anti-Stokes lines and $I_l$ is the irradiance of the l-th line of the multiple frequency excitation.

The most intense Stokes and anti-Stokes rotational Raman lines occur for the rotational quantum number $J_m$ given by equation (5). In order to have the most intense Stokes and anti-Stokes lines exactly superimposed in the resulting spectrum 26, the mirror separations for the primary and secondary interferometric means are given by the equations $$d_1 = n_1/[8\mu\{B-4D(J_m + 3/2)^2/(2J_m + 3)\}] \tag{20}$$

and $$d_2 = n_2/[8\mu\{B-4D(J_m + 3/2)^2/(2J_m + 3)\}] \tag{21}$$

where $d_1$ and $d_2$ refer to the primary and secondary interferometric means, respectively, $n_1$ and $n_2$ are odd integers and D is the centrifugal distortion constant.

A modulating means 54 is associated with beam generating means 48 for modulating the phase difference, $\phi$, so as to vary the intensity of the fringe. The modulating means 54 can, alternatively, be associated with the filtering means 28. In order to obtain the maximum modulated signal from the fringe appointed for detection, the modulating range is adjusted to approximately ½ the frequency width of the fringe. The modulating range can, alternatively, be restricted to preselected portions of the fringe in order to increase the intensity of the modulated signal. Generally speaking, the modulating range should be no greater than the frequency spacing between adjacent orders.

The detectable signal 32 from the filtering means 28 is collected and focused in the plane of pinhole stop 45 by a lens 43. Lens 43 is adjusted so that the center of the signal 32 is positioned on the pinhole 59. The intensity of the portion of signal 32 passing through the pinhole 59 is detected by a photomultiplier 61. A phase sensitive detection means 63, such as a lock-in amplifier, is adapted to receive the signal from the photomultiplier 61 and detect the intensity variation of the superimposed spectral component appointed for analysis. The output of the phase sensitive detection means 63 is displayed by an indicating and recording means 65, which can comprise an oscilloscope and a chart recorder.

Figure 4:
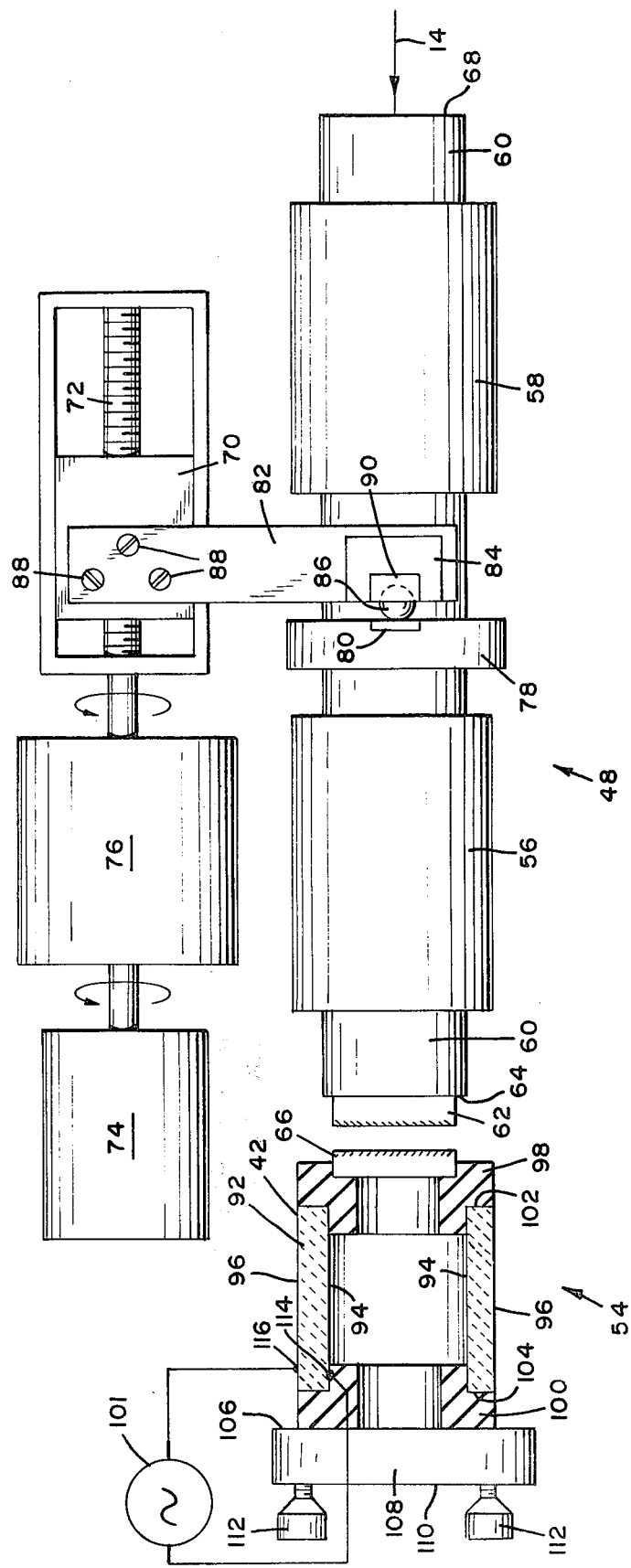
FIG. 4 is a side view, partially cut away, showing means for modulating the beam generating means of FIGS. 1 and 2.

In FIG. 4, the beam generating means 48 and he modulating means 54 are shown in greater detail. The beam generating means shown is a Fabry-Perot interferometer (EPI) which is scanned by varying the phase difference, $\phi$, between interfering beams of radiation in a conventional way. Scanning methods such as those wherein the pressure of gas between the mirrors of the FPI is altered so as to change the optical path therebetween can also be used. Accordingly, beam generating means 48 shown in FIG. 2 should be interpreted as illustrative and not in a limiting sense. Such means has cylindrical air bearings 56 and 58 which normally operate at about 30 psi and collectively support a hollow metal cylinder 60 approximately 35 cm. long and constructed of stainless steel or the like. The outer diameter of the cylinder 60 is centerless ground to about 4 cm. The inner diameter of the cylinder 60 is about 3.5 cm. Each of the air bearings 56 and 58 is about 8 cm. long and has outer and inner diameters of about 5 cm. and about 4 cm., respectively. The separation between centers of the air bearings is approximately 20 cm. One of the mirrors 62 of the beam generating means 48 is fixedly mounted on end 64 of cylinder 60 as by a suitable adhesive or the like. The plane surface of the mirror 62 is substantially perpendicular to the rotational axis of the cylinder. The other mirror 66 is fixedly mounted to the modulating means 54 as hereinafter described. Each of the air bearings 56 and 58 rests in precise v-blocks of a base plate (not shown) treated so as to dampen external vibrations. The radiation to be analyzed enters the beam generating means at end 68 of cylinder 60. A carriage 70 caused to move horizontally by means of a precision screw 72 and having a coupling arm 82 fixedly secured thereto by mechanical fastening means, such as screws 88, and to cylinder 60 as described hereinafter provides the cylinder 60 with the linear motion needed to scan the beam generating means 48. Precision screw 72 is coupled to a digital stepping motor 74 through gear assembly 76. The scan rate of the beam generating means 48 is controlled either by changing the gear ratio of assembly 76, as by means of magnetic clutches or the like, or by varying the pulse rate input to the digital stepping motor 74. With apparatus of the type described, the scan rate can be varied over a range as great as $10^6$ to 1 or more.

In order to transmit precisely the linear motion to cylinder 60, a collar 78 having glass plate 80 adhesively secured thereto, is fixedly attached to the cylinder 60. The coupling arm 82 has a ball 86 comprised of stainless steel, or the like, associated with an end 84 thereof. A permanent magnet 90 is attached to end 84 of coupling arm 82 near the ball 86. Due to the magnetic attraction between the collar 78 and the magnet 90, the ball is held in contact with the glass plate 80. A low friction contact point is thereby provided. The contact force produced at such contact point by linear movement of the carriage 70 can be adjusted either by varying the separation between the magnet 90 and the collar 78, or by decreasing the strength of the magnet 90.

A sectional view of one form of modulating means 54 is shown in FIG. 4. Other forms of the modulating means 54 can also be used. Preferably, the modulating means 54 has a hollow cylindrical body 92 of piezoelectric ceramics. The inner and outer wall 94 and 96 of the cylindrical body 92 are coated with an electrically conductive material such as silver or the like.

Insulating members 98 and 100 comprised of an insulating material such as ceramic or the like are secured to the cylindrical body 92, at ends 102 and 104, respectively, by a suitable adhesive such as an epoxy resin. Mirror 66 is fixedly attached to insulating member 98 by an adhesive of the type used to secure mirror 62 to the end 64 of cylinder 60. In order that mirror 66 be maintained in parallel with mirror 62, the insulating member 100 is adhesively secured to face 106 of holding member 108. The outer face 110 of the holding member 108 has connected thereto a plurality of differential screw micrometers 112, which can be adjusted in the conventional way to provide for precise angular alignment of the mirror 66. Electrodes 114 and 116 are attached to the inner wall 94 and the outer wall 96, respectively. Voltage having a wave form such as a sine wave or a square wave impressed thereon is applied from a high voltage low current power supply 101 to the electrodes 114 and 116. Upon application of the voltage the cylindrical body 92 is caused to modulate in a linear direction, whereby the intensity of signal 32 is varied. When the voltage applied from power supply 101 to electrodes 114 and 116 has the form of a square wave, the voltage limits of the wave form can be adjusted so that the intensity of the superimposed spectral component to be detected from signal 32 alternates between its maximum and minimum values. A synchronous detection means is provided for determining the difference in photon count between the maximum and minimum values of the component for each cycle of the square wave to produce a signal count and accumulating the signal count for a preselected period of time over a preselected number of cycles of the square wave, the preselected time period and preselected number of cycles varying inversely with the intensity of said component. As a result, the accuracy of the detecting means and hence the sensitivity of the apparatus 10 is increased by a factor in the order of about 100 or more.

The apparatus 10 which has been disclosed herein can, of course, be modified in numerous ways without departing from the scope of the invention. For example, the beam generating means 48 can be fixed etalon tuned by controlling the temperature thereof. One type of fixed etalon which is suitable is comprised of optically transparent material, such as fused silica, having opposed surfaces which are polished, flat, parallel and coated with silver, dielectric material or the like for high reflectivity at a preselected frequency region. The thickness of the etalon used in the beam generating means 48 can be chosen so that the spectral range of the etalon corresponds approximately to an odd integral submultiple of the frequency difference between adjacent spectral components of the periodic spectrum for a preselected constituent of gaseous material. Fine tuning of the solid etalon used in the beam generating means 48 is affected by providing means for controlling the temperature, and hence the optical path length, thereof so as to displace the frequency of the radiation beams relative to the frequencies of the transmission window of the filtering means 28 so that the frequency of the transmission window is located substantially half-way between adjacent radiation beams. As previously noted, the radiation 22 to be analyzed need not be Raman scattered radiation solely but can be any scattered radiation from the visible, infrared or ultraviolet frequency regions which has spectral components periodic in frequency. The radiation conditioning means 52 and the modulating means 54 can be separately combined with the apparatus, although their collective employment results in maximum sensitivity and is therefore preferred. The tuning means 16 and the frequency shifting means 34 can alternatively be associated with the filtering means 28. The increased sensitivity of the apparatus makes it especially suited for detection at distant locations of gaseous constituents present in the low parts per million range. Hence, the gaseous material need not be located within a sample compartment, but may instead be loated at points distant from the apparatus 10, as in the order of up to about five miles distance therefrom. Other similar modifications can be made which fall within the scope of the present invention. It is, accordingly, intended that all matter contained in the above description and shown in the accompanying drawings be interpreted as illustrative and not in a limiting sense.

In operation of the preferred apparatus, radiation source means 12 generates a plurality of spatially superimposed beams 14 of monochromatic radiation. The frequency difference between radiation beams 14 of adjacent frequency is adjusted by tuning means 16 to equal substantially an odd integral submultiple of the frequency difference between adjacent spectral components of the periodic spectrum for a preselected constituent of gaseous material. Projecting means 18 directs the radiation beams 14 through the gaseous material to produce scattered radiation 22 having spectral components periodic in frequency, the spectral components for the preselected constituent being superimposed to form within the spectrum produced by combined scattering of the radiation beams, the periodic spectrum for the preselected constituent. A filtering means 28 receives the scattered radiation 22 and selectively separates therefrom a detectable signal 22 composed of a single superimposed spectral component of the spectrum. The filtering means 28 directs the scattered radiation 22 through a single transmission window centered on the frequency of one of the superimposed spectral components of the preselected constituent. A frequency shifting means 34 associated with the tuning means 16 displaces the frequencies of the radiation beams 14 relative to the frequency of the transmission window of the filtering means 28 so that the frequency of the transmission window is located substantially half-way between adjacent radiation beams. The resultant signal 32 from the filtering means 28 is displayed by the indicating and recording means 65.

Having thus described the invention in rather full detail, it will be understood that these details need not be strictly adhered to but that various changes and modifications may suggest themselves to one skilled in the art, all falling within the scope of the present invention as defined by the subjoined claims.

We claim:

1. Apparatus for spectroscopically analyzing gas comprising:

a. radiation source means for generating a plurality of spatially superimposed beams of monochromatic radiation;
    b. tuning means for adjusting the frequency difference between radiation beams of adjacent frequencies to equal substantially an odd integral submultiple of the frequency difference between adjacent spectral components of the periodic spectrum for a preselected constituent of gaseous material;
    c. projecting means for directing said radiation beams through said gaseous material to produce scattered radiation, the scattered radiation produced by each of said radiation beams having spectral components periodic in frequency and the spectral components for said preselected constituent being superimposed to form, within the spectrum produced by combined scattering of said radiation beams, the periodic spectrum for said preselected constituent;
    d. filtering means adapted to receive said scattered radiation, for selectively transmitting a detectable signal composed of a single superimposed spectral component of said spectrum, whereby said detectable signal is derived from a plurality of spectral lines and has an intensity substantially equal to their sum.

2. Apparatus as recited in claim 1, wherein said filtering means has interference-producing means for providing a single transmission window centered on the frequency of one of said superimposed spectral components of said preselected constituent.

3. Apparatus as recited in claim 2 wherein said filtering means has associated therewith a frequency shifting means for displacing the frequencies of said radiation beams relative to the frequency of said transmission window is located half-way between adjacent radiation beams.

4. Apparatus as recited in claim 2 wherein said tuning means has associated therewith a frequency shifting means for displacing the frequencies of said radiation beams relative to the frequency of said transmission window so that the frequency of said transmission window is located half-way between adjacent radiation beams.

5. Apparatus as recited in claim 1 wherein said radiation source means comprises a dye laser including a dye cell containing a dye material, means for exciting said dye and a laser cavity comprised of an optical element and a partially transmitting output mirror for generating and transmitting laser radiation.

6. Apparatus as recited in claim 5 wherein said dye material emits radiation upon being excited, said radiation having frequencies within the transparency range of said gaseous material.

7. Apparatus as recited in claim 1 including detecting means for indicating the intensity of said signal.

8. Apparatus as recited in claim 7 including modulating means for modulating the phase difference between interfering rays of said radiation so as to vary the intensity of said superimposed spectral component, the modulating range being no greater than the frequency spacing between adjacent orders.

9. Apparatus as recited in claim 8 wherein said modulating means has a modulating range of about 1/2 the frequency difference between adjacent radiation beams.

10. Apparatus as recited in claim 8 wherein said modulating means is a piezoelectric cylinder and said detecting means is a phase sensitive detection system.

11. Apparatus as recited in claim 1 wherein said radiation source means is provided with means for projecting radiation having a line width and frequency stability about equal to or less than the instrumental width of said filtering means.

12. Apparatus as recited in claim 5 wherein said means for exciting said dye is a pulsed laser.

13. Apparatus as recited in claim 12 wherein said laser is associated with a time gated electronic detection system having (1) means for measuring the time interval required to send a pulse from said laser into a sample of said gaseous material and receive a return signal caused by light scattered therein and (2) means for measuring the amplitude of said return signal.

14. Apparatus as recited in claim 1 wherein said periodic spectrum is the spectrum produced by Raman scattering of a minor constituent of a gaseous material.

15. Apparatus as recited in claim 14 wherein said gaseous material is air.

16. Apparatus as recited in claim 5 wherein said radiation source means includes a multiple frequency beam generating means for separating said radiation into a plurality of spatially superimposed beams of monochromatic radiation.

17. Apparatus as recited in claim 16 wherein said multiple frequency beam generating means is a Fabry Perot interferometer.

18. Apparatus as recited in claim 10 including means for applying to said cylinder a voltage having a square wave form, the limits of said voltage being adjusted so that the intensity of said superimposed spectral component alternates between its maximum and minimum values, means for determining for each cycle of said voltage the difference in photon count between said maximum and minimum values of said component to produce a signal count, and means for accumulating said signal count for a preselected period of time over a preselected number of cycles of said square wave.

19. Apparatus as recited in claim 18 including means for varying the preselected time period and the preselected number of cycles inversely with the intensity of said component.

20. Apparatus as recited in claim 10 wherein said phase sensitive detection system is a lock-in amplifier.

21. Apparatus as recited in claim 8 wherein said modulating means is a piezoelectric cylinder and said synchronous detection means is a photon counting system.

22. A method for spectroscopically analysing gas comprising the steps of:
  a. generating a plurality of spatially superimposed beams of monochromatic radiation;
  b. adjusting the frequency difference between radiation beams of adjacent frequencies to equal substantially an odd integral sub-multiple of the frequency difference between adjacent spectral components of the periodic spectrum for preselected constituent of gaseous material;
  c. directing said radiation beams through said gaseous material to produce scattered radiation, the scattered radiation produced by each of said radiation beams having spectral components periodic in frequency and the spectral components for said preselected constituent being superimposed to form, within the spectrum produced by combined scattering of said radiation beams, the periodic spectrum for said preselected constituent; and
  d. filtering the scattered radiation to selectively transmit a detectable signal composed of a single superimposed spectral component of the spectrum.

* * * * *

UNITED STATES PATENT AND TRADEMARK OFFICE
CERTIFICATE OF CORRECTION

PATENT NO. : 4,008,961
DATED : February 22, 1977
INVENTOR(S) : Joseph J. Barrett & Ernest D. Buff It is certified that error appears in the above-identified patent and that said Letters Patent are hereby corrected as shown below:

Col. 6, formula (5), that portion of the formula "...=[Kt/(2Bhc)]..." should read -- =[KT/(2Bhc)] --.

lines 57 & 58 "...spectral range $\Delta w$ $\Delta w$ of the secondary..." should read -- spectral range $\Delta w$ of the secondary --.

Col. 7, formula (10), the formula "$w=w_0+1(4B/N_2)$" should read -- $w=w_0+\ell(4B/N_2)$ --.

line 5, "...region and 1 takes on the..." should read -- region and $\ell$ takes on the --.

line 8, "...maximum value, $l_m$, of the integer 1 is limited by..." should read -- maximum value, $\ell_m$, of the integer $\ell$ is limited by --.

UNITED STATES PATENT AND TRADEMARK OFFICE
CERTIFICATE OF CORRECTION

PATENT NO. : 4,008,961
DATED : February 22, 1977
INVENTOR(S) : Joseph J. Barrett & Ernest D. Buff It is certified that error appears in the above-identified patent and that said Letters Patent are hereby corrected as shown below:

Col. 7, formula (11) "$W=2l_m(4B/N_2)$ or $l_m=Wn_2/(8B)$." should read -- $W=2\ell_m(4B/N_2)$ or $\ell_m=Wn_2/(8B)$. -- line 16, "$2l_m+1$ discrete frequencies." should read -- $2\ell_m+1$ discrete frequencies. --.

formula (12), that portion of the formula "...$w_{S.A}=w_0\overline{+}4B$..." should read -- $w_{S,A}=w_0\overline{+}4B$ -- formula (13), "$w_{S.A}=w_0+1(4B/n_2) \quad 4B(J+3/2)$" should read -- $w_{S,A}=w_0+\ell(4B/n_2) \overline{+} 4B(J+3/2)$ --.

line 35, "...value of 1 varies from $-l_m$ to $l_m$ and..." should read -- value of $\ell$ varies from $-\ell_m$ to $\ell_m$ and --.

line 41, "...further simplified by setting $n_n$ in..." should read -- further simplified by setting $n_2$ in --.

UNITED STATES PATENT AND TRADEMARK OFFICE
CERTIFICATE OF CORRECTION

PATENT NO. : 4,008,961

DATED : February 22, 1977

INVENTOR(S) : Joseph J. Barrett & Ernest D. Buff

It is certified that error appears in the above-identified patent and that said Letters Patent are hereby corrected as shown below:

Col. 7, formula (14), "$w_S = w_0 + 4B1 - 4B(J+3/2)$ or $w_S = w_0 - 6B + 4B(1-J)$."

should read -- $w_S = w_0 + 4B\ell - 4B(J+3/2)$ or $w_S = w_0 - 6B + 4B(\ell - J)$ -- line 50, "For 1 = J, the Raman lines" should read

-- For $\ell$ + J, the Raman lines --.

line 51, "6B): e.g. for 1 = 0, the" should read

-- 6B); e.g. for $\ell$ = 0, the --.

line 52, "line has the frequency ($w_0 - 6B$); for 1 ="

should read -- line has the frequency ($w_0 - 6B$); for $\ell$ = -- line 59, "...For 1 = J + 1, this..." should read

-- For $\ell$ = J + 1, this --.

UNITED STATES PATENT AND TRADEMARK OFFICE
CERTIFICATE OF CORRECTION

PATENT NO. : 4,008,961

DATED : February 22, 1977

INVENTOR(S) : Joseph J. Barrett & Ernest D. Buff

It is certified that error appears in the above-identified patent and that said Letters Patent are hereby corrected as shown below:

Col. 7, formula (15), that portion of the formula

"$\ldots +4B \sum_{\iota=-\iota_m}^{\iota_m} \sum_{J=0}^{J_M} (\iota-J)$" should read -- $+4B \sum_{\ell=-\ell_m}^{\ell_m} \sum_{J=0}^{J_M} (\ell-J)$ --.

Col. 8, formula (16), that portion of the formula

"$\ldots +4B \sum_{\iota=-\iota_m}^{\iota_m} \sum_{J=0}^{\iota_M} (\iota+J).$" should read -- $+4B \sum_{\ell=-\ell_m}^{\ell_m} \sum_{J=0}^{\ell_M} (\ell+J).$ --.

line 13, "...values from zero to ( $l_m$ +"

should read -- values from zero to ($|\ell_m|$ + --.

UNITED STATES PATENT AND TRADEMARK OFFICE
CERTIFICATE OF CORRECTION

PATENT NO. : 4,008,961
DATED : February 22, 1977
INVENTOR(S) : Joseph J. Barrett & Ernest D. Buff It is certified that error appears in the above-identified patent and that said Letters Patent are hereby corrected as shown below:

Col. 8, formula (18), that portion of the formula

"$...w_0 \pm (2B/n_2)...$" should read -- $w_0 \pm (2B/n_2)$ --.

line 18, "For $l_m \quad J_M$, and in the frequency interval $w_0 \pm 2Bl_m$," should read -- For $\ell_m \geq J_M$, and in the frequency interval $w_0 \pm 2B\ell_m$, --.

formula (19), that portion of the formula

"$...[H_S(J) \cdot I_{l'} + H_A(J) \cdot I_{l''}]$" should read

-- $[H_S(J) \cdot I_{\ell'} + H_A(J) \cdot I_{\ell''}]$ --.

line 29, "where $1' = j + J + 1$ for Stokes lines and $1'' = j - J - 1$" should read -- where $\ell' = j + J + 1$ for Stokes lines and $\ell'' = j - J - 1$ --.

line 30, "...lines and $I_l$ is the irradiance of the l-th" should read -- lines and $I_\ell$ is the irradiance of the $\ell$-th --.

UNITED STATES PATENT AND TRADEMARK OFFICE
CERTIFICATE OF CORRECTION

PATENT NO. : 4,008,961
DATED : February 22, 1977
INVENTOR(S) : Joseph J. Barrett & Ernest D. Buff It is certified that error appears in the above-identified patent and that said Letters Patent are hereby corrected as shown below:

Col. 8, line 33, "...is where l' = j + J + 1 for..."

should read -- is where $\ell' = j + J + 1$ for --.

line 34, "and l" = j - J - 1 for anti-Stokes lines and $I_l$ is the" should read -- and $\ell" = j - J - 1$ for anti-Stokes lines and $I_\ell$ is the --.

line 35, "...of the l-th line of the multiple..."

should read -- of the $\ell$-th line of the multiple --.

Column 14, line 23, "spectrum for preselected" should read -- spectrum for a preselected --.

Signed and Sealed this ninth Day of August 1977

[SEAL]

Attest:

RUTH C. MASON
*Attesting Officer*

C. MARSHALL DANN
*Commissioner of Patents and Trademarks*